US007747415B1

(12) United States Patent  
Churchill et al.

(10) Patent No.: US 7,747,415 B1  
(45) Date of Patent: Jun. 29, 2010

(54) SENSOR POWERED EVENT LOGGER

(75) Inventors: David L. Churchill, Burlington, VT (US); Frederic P. Martin, Richmond, VT (US); Michael J. Hamel, Essex Junction, VT (US); Christopher P. Townsend, Shelburne, VT (US); Steven W. Arms, Williston, VT (US)

(73) Assignee: Microstrain, Inc., Williston, VT (US)

( * ) Notice: Subject to any disclaimer, the term of this patent is extended or adjusted under 35 U.S.C. 154(b) by 38 days.

(21) Appl. No.: 11/644,038

(22) Filed: Dec. 22, 2006

Related U.S. Application Data

(60) Provisional application No. 60/753,481, filed on Dec. 22, 2005.

(51) Int. Cl.
  G01L 1/00 (2006.01)
  G01L 3/00 (2006.01)
  G01L 5/00 (2006.01)
  G06F 17/40 (2006.01)

(52) U.S. Cl. .................. 702/187; 702/42; 702/189

(58) Field of Classification Search ............. 702/189, 702/42, 33
  See application file for complete search history.

(56) References Cited

U.S. PATENT DOCUMENTS

| 5,446,864 | A  | * | 8/1995  | Burghardt et al. ........... 711/100 |
| 5,454,114 | A  | * | 9/1995  | Yach et al. .................. 713/330 |
| 5,455,937 | A  | * | 10/1995 | Berman et al. ................ 703/23 |
| 5,504,903 | A  | * | 4/1996  | Chen et al. ...................... 713/1 |
| 5,568,345 | A  | * | 10/1996 | Mudd et al. .................... 361/56 |
| 5,573,013 | A  | * | 11/1996 | Conlan ........................ 600/595 |
| 5,774,377 | A  | * | 6/1998  | Eidson et al. ............... 702/187 |
| 6,295,473 | B1 | * | 9/2001  | Rosar .......................... 607/60 |
| 6,494,838 | B2 | * | 12/2002 | Cooley et al. ............... 600/443 |
| 6,614,697 | B2 | * | 9/2003  | Hogan .................... 365/189.02 |
| 2002/0024450 | A1 | * | 2/2002 | Townsend et al. ...... 340/870.16 |
| 2003/0234730 | A1 |   | 12/2003 | Arms |
| 2004/0078662 | A1 | * | 4/2004 | Hamel et al. .................. 714/22 |
| 2004/0113790 | A1 |   | 6/2004 | Hamel |
| 2004/0200109 | A1 | * | 10/2004 | Vasquez ..................... 42/1.01 |
| 2005/0017602 | A1 |   | 1/2005 | Arms |
| 2006/0056575 | A1 | * | 3/2006 | Mehnert et al. ............... 377/89 |
| 2007/0144396 | A1 |   | 6/2007 | Hamel |
| 2008/0036617 | A1 |   | 2/2008 | Arms |

* cited by examiner

*Primary Examiner*—Hal D Wachsman  
*Assistant Examiner*—Janet L Suglo  
(74) *Attorney, Agent, or Firm*—James Marc Leas

(57) ABSTRACT

A system includes a structure and a circuit. The circuit is mounted to the structure. The circuit includes a sensor, a non-volatile memory, and a voltage sensitive switch. The memory and the voltage sensitive switch are connected for recording an event sensed by said sensor. The recording only uses power derived from the sensor. One embodiment of the circuit includes a processor connected for receiving a signal derived from the sensor. In this embodiment the non-volatile memory is connected to the processor for receiving and storing data derived from the signal. In one embodiment a first energy storage device is connected to receive energy from the sensor. The voltage sensitive switch is connected for releasing energy from the first energy storage device when energy stored in the first energy storage device exceeds a threshold. The processor and the non-volatile memory are connected for receiving power from the released energy.

45 Claims, 6 Drawing Sheets

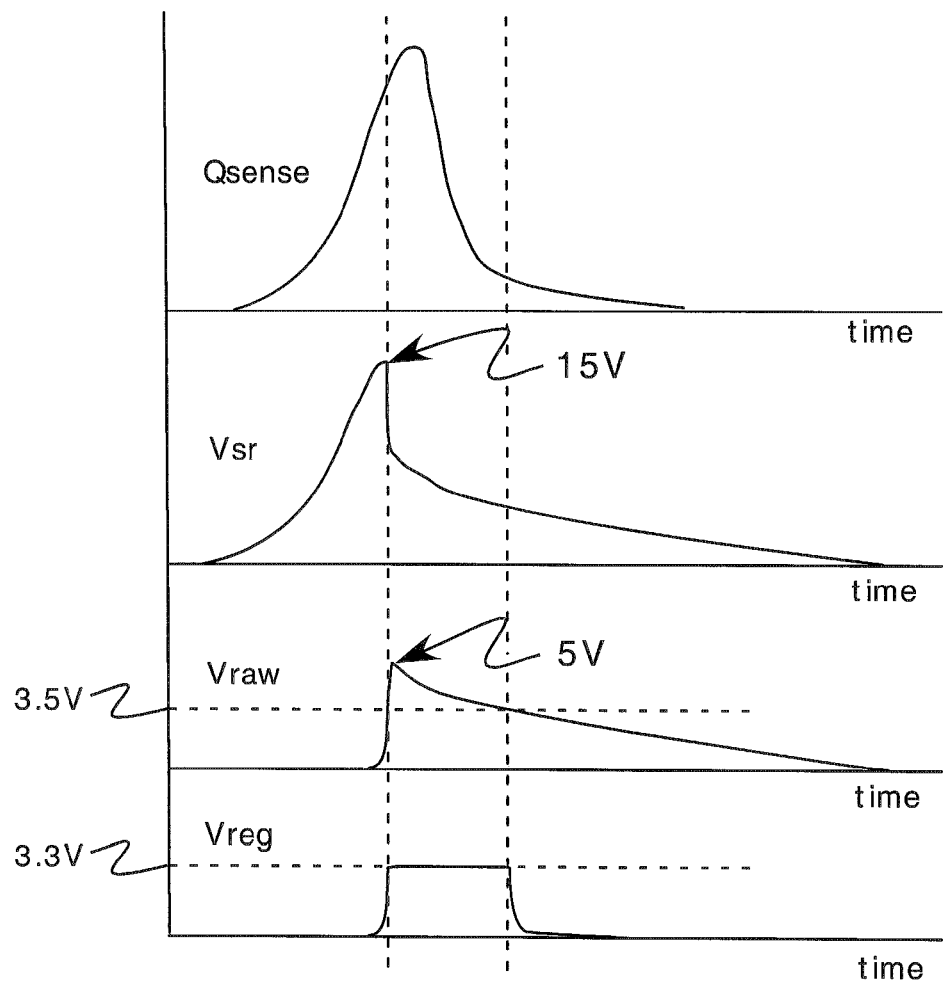

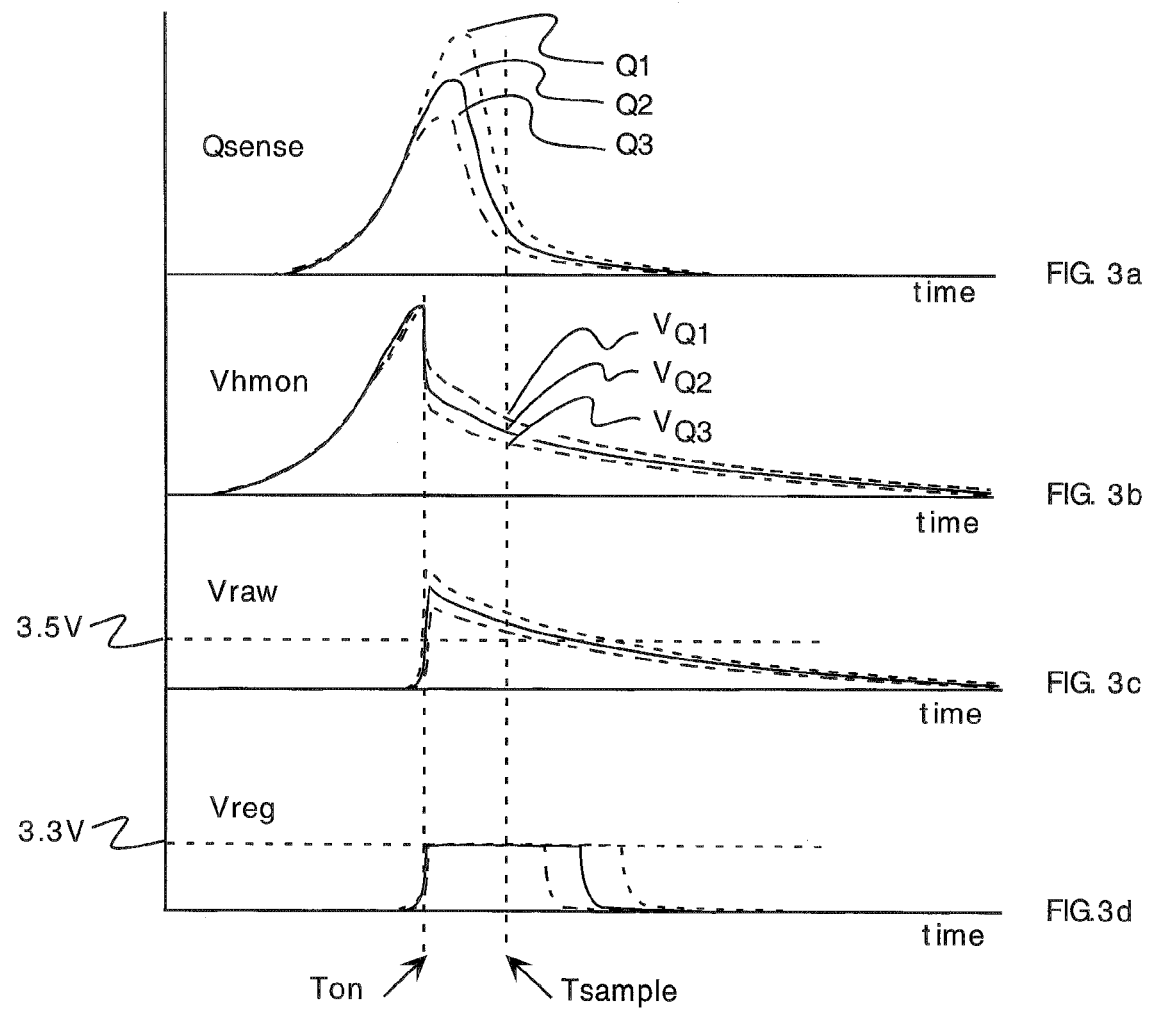

SENSOR POWERED EVENT LOGGER

RELATED APPLICATIONS AND PRIORITY

This application claims priority of Provisional Patent Application 60/753,481, filed Dec. 22, 2005, incorporated herein by reference.

This application is related to the following commonly assigned patent applications:

"Structural Damage Detection and Analysis System," U.S. patent application Ser. No. 11/585,059 to M. Hamel, et al, filed Oct. 23, 2006, ("the '059 application").

"Remotely Powered and Remotely Interrogated Wireless Digital Sensor Telemetry System," U.S. patent application Ser. No. 10/668,827 to M. Hamel, filed Sep. 23, 2003 ("the '827 application").

"Energy Harvesting for Wireless Sensor Operation and Data Transmission," U.S. Pat. No. 7,081,693 to M. Hamel et al., filed Mar. 5, 2003 ("the '693 patent").

"Shaft Mounted Energy Harvesting for Wireless Sensor Operation and Data Transmission," U.S. patent application Ser. No. 10/769,642 to S. W. Arms et al., filed Jan. 31, 2004 ("the '642 application").

"Robotic system for powering and interrogating sensors," U.S. patent application Ser. No. 10/379,224 to S. W. Arms et al, filed Mar. 5, 2003 ("the '224 application").

"Energy Harvesting, Wireless Structural Health Monitoring System," U.S. patent application Ser. No. 11/518,777, to S. W. Arms et al, filed Sep. 11, 2006 ("the '777 application").

All of the above listed patents and patent applications are incorporated herein by reference.

FIELD

This patent application generally relates to a system for using energy generated by a sensor to power logging data from the sensor.

BACKGROUND

Several types of sensors generate a voltage or current when excited by an event, including piezoelectric sensors, thermocouples, pressure sensors, and displacement sensors. For example, when a piezoelectric sensor is flexed it generates a voltage that depends on the magnitude of flexing. The voltage generated can be supplied to a circuit that may record data regarding bending, tensile, and compression events sensed by the piezoelectric sensor, as described in the '693 patent and the '059 patent application. Circuits for non-volatile recording of data from an event have needed a source of power, such as may be supplied by a wired source of power or by an energy storage device, such as a capacitor or battery. The energy storage device could be recharged by energy harvesting. For example, piezoelectric devices have been used to harvest energy from a structure subject to strain or vibration, as described in the '693 patent. This energy could then be stored and used to power the circuit for logging data from sensors, processing the data, and transmitting the data.

A circuit that records an event sensed by a sensor using only energy provided by that event was described in the commonly assigned '059 patent application. In this regard, the '059 application describes a system for electronically recording an event that provides mechanical energy to a structure. The system includes the structure and an event sensing and recording node. The event sensing and recording node is mounted on the structure and includes a sensor and a first electronic memory. The sensor includes a device for converting the mechanical energy into an electrical signal. The first electronic memory uses energy derived from the electrical signal for electronically recording the event. All energy for sensing the event and recording the event in the first electronic memory is derived from the mechanical energy. A circuit was also described in that the '059 application that allows for measuring the magnitude of that event. That patent application also provided several uses for the circuit.

As the '059 application noted, "advantageously, the system uses little energy for recording the event and it can harvest that energy from the event itself." The '059 application also noted that the "event logging circuit [of the '059 application] is self-powered because electricity generated by one of the piezoelectric sensors of [the] array . . . [of the '059 application], as it senses an event, is the electricity used for logging that event in a memory location of [the] event logging circuit . . . . While another source of power may be needed for circuits that read that memory or that take further action based on data in that memory, the event logging circuit itself is self-powered since the event it is detecting is the sole source of energy for operation of the event logging circuit to log the event in its memory. The . . . inventors [of the '059 application] have also found a way to arrange these circuits to provide a self-powered recording indicating the magnitude of the event."

The present application provides an alternate scheme for using energy from an event sensed by a sensor to power a circuit for recording that event and for measuring its magnitude.

SUMMARY

One aspect of the present patent application is a system that includes a structure and a circuit. The circuit is mounted to the structure. The circuit includes a sensor, a non-volatile memory, and a voltage sensitive switch. The memory and the voltage sensitive switch are connected for recording an event sensed by said sensor. The recording only uses power derived from the sensor.

Another aspect is a system that includes a structure and a circuit. The circuit is mounted to the structure. The circuit includes a sensor, a processor, and a non-volatile memory. The processor and the memory are connected for measuring and recording an event sensed by the sensor. The measuring and recording uses only power derived from the sensor.

Another aspect is a system that includes a structure and a circuit. The circuit is mounted to the structure. The circuit includes a sensor, a voltage sensitive switch, a logic circuit, and a memory. The logic circuit and the memory are connected for recording an event sensed by the sensor. The recording uses only power derived from the sensor.

Another aspect is a system that includes a structure and a circuit. The circuit is mounted to the structure. The circuit includes a sensor, a voltage sensitive switch, a processor and a memory. The processor and the memory are connected for recording an event sensed by the sensor. The recording uses only power derived from the sensor.

BRIEF DESCRIPTION OF THE DRAWINGS

The foregoing will be apparent from the following detailed description as illustrated in the accompanying drawings, in which:

FIGS. 2*a*-2*d* are timing diagrams for the circuit of FIG. 1*a* showing energy and voltages at various points in the circuit as time progresses in response to an event sensed by a piezoelectric sensor;

FIGS. 3*a*-3*d* are timing diagrams for the circuit of FIG. 1*a* showing energy and voltages at various points in the circuit as time progresses in response to events having different magnitudes and producing different magnitude responses in the piezoelectric sensor;

DETAILED DESCRIPTION

The present applicants found that the voltage provided by a piezoelectric sensor provides a tiny amount of power that can be recorded and measured by a circuit and that can also be scavenged to power the measuring and recording circuit. Thus, the power generated by the sensor is used both as signal to and power source for an electronic circuit that records the event.

In one embodiment, a power conditioning circuit and a digital delay circuit provide both power and signal to a low power non-volatile ferro-magnetic memory to record an event and to a counter to record the number of such events using only the power from the event. In another embodiment, a power conditioning circuit provides power for operating a low power microcontroller unit and a low power non-volatile ferro-magnetic memory for both measuring the magnitude of an event and record the event using only the power from the event.

In either case data can be retrieved at a later time using power from another source, such as a wired connection or a switched reactance reader, as described in the '827 application. The wired connection could be a USB interface.

Figure 1A:
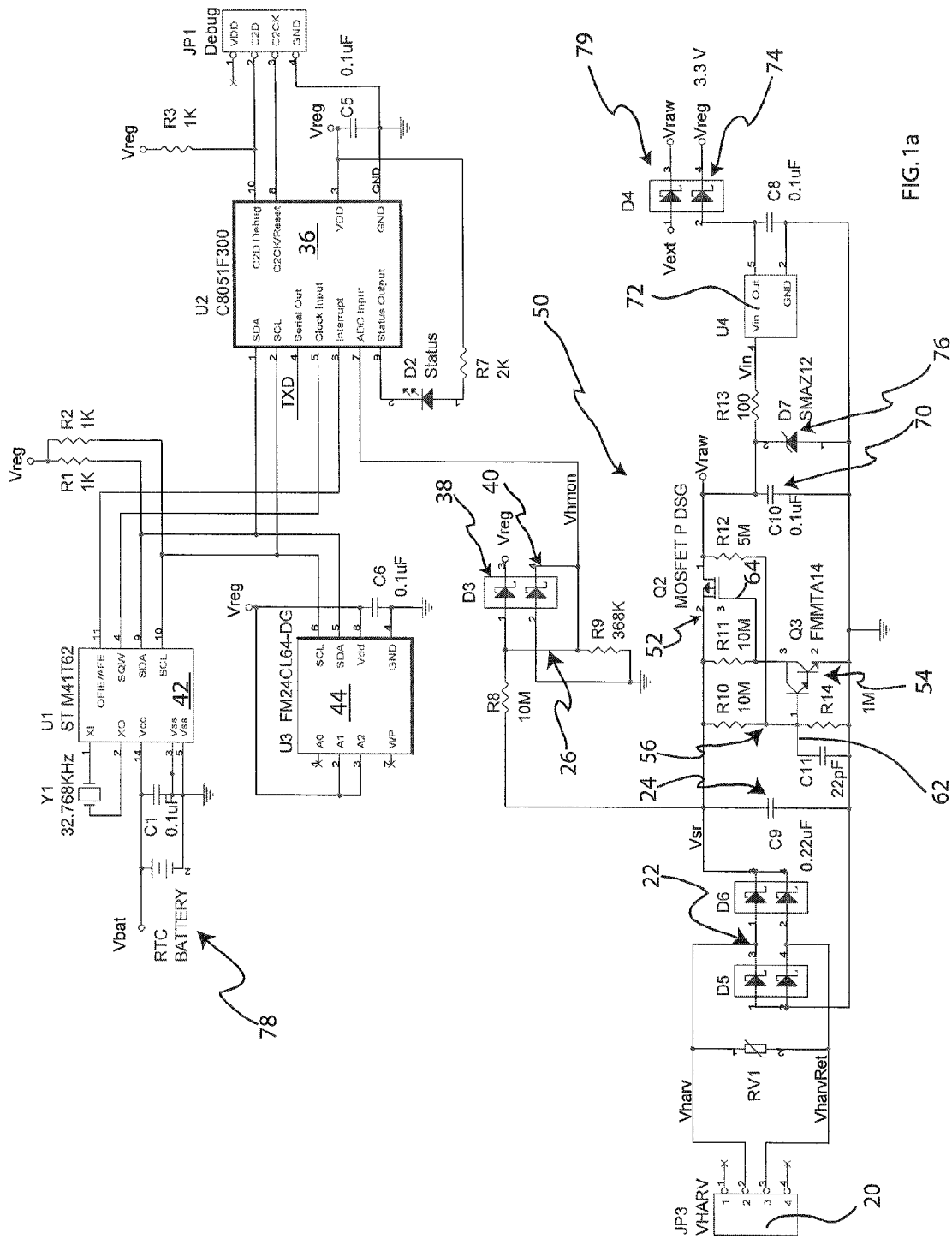
FIG. 1a is a schematic diagram of an energy harvesting sensor measuring circuit that uses energy derived from a sensor to power electronic devices for measuring and logging the data in a non-volatile memory.

Power generated from an event by energy harvesting piezoelectric sensor 20 is rectified by diode bridge 22 including diodes D5 and D6 and stored in DC power reservoir capacitor 24 (capacitor C9), as shown in the schematic diagram in FIG. 1*a*. For sensing the magnitude of the event, the rectified voltage stored in reservoir capacitor 24 is first divided by voltage divider 26, including resistors R8 and R9, to reduce the potentially high voltage signal across reservoir capacitor 24 to a safe range that can be provided to the analog to digital converter (ADC) input of low power microcontroller 36 (U2) part number C8051F300 available from Silicon Labs, Austin, Tex. Further protection of microcontroller 36 is provided by diode clamps 38, 40 in diode D3 that limit the range of voltages that can be supplied to the ADC input of microcontroller 36. Microcontroller 36 will provide signal conditioning, including analog to digital conversion, and supply data based on the voltage applied to its ADC input as a digital signal along with time from real time clock 42 (U1) part number STM41T62 from STMicroelectronics, Carrollton, Tex., to non-volatile memory 44, such as ferroelectric random access memory (FRAM) (U3) FM24CL64-DG from Ramtron Corp., Colorado Springs, Colo. Electrically erasable programmable read only memory (EEPROM) or another memory device can also be used. FRAM has advantage because of its faster write time, lower power consumption, and the fact that it can be written to many more times than EEPROM.

For providing power to microcontroller 36 and memory 44, the rectified voltage stored in reservoir capacitor 24 is also applied to very low power energy harvesting circuit 50 that prevents power from being applied to microprocessor 36 unless sufficient charge has accumulated and that provides power to microprocessor 36 at a high enough rate to avoid damage to microprocessor 36. Energy harvesting circuit 50 includes voltage divider 56, pass transistor 52 (Q2), and switching transistor 54 (Q3). Voltage divider 56 includes resistors R10 and R14. In voltage divider 56, resistor R10 is provided with a resistance large enough to make leakage negligible when switching transistor 54 turns on. Pass transistor 52 may be a MOS PFET and switching transistor 54 may be a Darlington pair.

A single energetic event can provide sufficient charge to reservoir capacitor 24 to turn on energy harvesting circuit 50. Energy harvesting circuit 50 waits for a signal from piezoelectric sensor 20 and diode bridge 22 that provides a potential across reservoir capacitor 24 that reaches a preset voltage to provide sufficient current to base 62 to turn on switching transistor 54. Turned on switching transistor 54 lowers the voltage on gate 64 of PFET pass transistor 52 which then turns on, allowing charge in reservoir capacitor 24 to dump into regulator filter capacitor 70. Energy harvesting circuit 50 includes switching transistor 54 and pass transistor 52 to prevent charge from being transferred to regulator filter capacitor 70 until sufficient energy has been provided by an event detected by piezoelectric sensor 20 to rapidly turn on and operate low power microcontroller 36 and FRAM 44 for a sufficient time to record the data about the event.

Once charge has been transferred to regulator filter capacitor 70, voltage $V_{raw}$ across regulator filter capacitor 70 should be sufficient to turn on voltage regulator 72 (U4) and provide regulated voltage output $V_{reg}$ that is used to power microcontroller 36 and memory 44. In this case $V_{reg}$ is 3.3 volts. Output of voltage regulator 72 is provided through diode clamp 74 (D4). Diode clamp 74 is a blocking diode, preventing reverse current from flowing into voltage regulator 72, for example from clamp 38, if there is a large voltage spike from piezoelectric 20. Zener diode 76 (D7) limits the voltage that is provided to regulator 72 to keep it from being damaged if voltage $V_{raw}$ across regulator filter capacitor 70 gets too high. Resistor R13 is a very small resistor, dissipating little power but it provides a way to measure the current to voltage regulator 72 during testing. It can be removed after testing of the circuit is complete.

Output of voltage regulator 72 at diode clamp 74 provides a regulated power for other components, including microprocessor 36 and FRAM 44.

Voltage regulator 72 may continue to provide regulated voltage output $V_{reg}$ until voltage $V_{raw}$ across regulator filter capacitor 70 has been reduced below the threshold voltage needed to operate voltage regulator 72. Resistor R12 provides feedback to the base of switching transistor 54. With switching transistor 54 off, $V_{raw}$ is low, 0V, and charge on C10 is also zero. In this case resistor R12 is in parallel with resistor R14 in voltage divider 56. When switching transistor 54 is on, resistor R12 is now connected to $V_{sr}$, $V_{raw}$, and is in parallel with resistor R10. Switching transistor 54 turning on effectively changes the role of resistor R12. The parallel resistors R10 and R12 have lower equivalent resistance than just R10, which brings base voltage of switching transistor 54 higher. This holds switching transistor 54 on, keeping switch 52 open after it would have closed without resistor R12. Thus, resistor R12 provides hysteresis, keeping switch 52 on longer. This allows the initial turn on voltage of switching transistor 54 to be higher than the voltage needed to keep it on, allowing switch 52 to stay on as $V_{sr}$ falls from its 15 volt turn on until it is less than about 5 volts.

Voltage $V_{raw}$ on regulator filter capacitor 70 may remain high enough to allow voltage regulator 72 to continue to provide a regulated voltage after voltage on reservoir capacitor 24 has diminished to the point that pass transistor 52 and switching transistor 54 have turned off.

In one example of operation of energy harvesting circuit 50, charge $Q_{sense}$ is provided over a period of time by an event sensed by piezoelectric sensor 20, as shown by FIG. 2a. Voltage $V_{sr}$ measured across reservoir capacitor 24 increases until voltage provided by voltage divider 56 is sufficient—in this case 16 volts—to turn on pass transistor 52 and switching transistor 54, quickly transferring part of the charge on reservoir capacitor 24 to regulator filter capacitor 70, rapidly lowering voltage $V_{sr}$ across reservoir capacitor 24, as shown in FIG. 2c, and rapidly increasing voltage $V_{raw}$ across regulator filter capacitor 70 to the same value—in this case 5 volts, as shown in FIG. 2c. Equalized voltage across both capacitors 24 and 70 then continues to decline as power is used and leaks away as also shown in FIG. 2b and FIG. 2c. After pass transistor 52 opens voltage regulator 72 may continue to draw current from capacitor 70 as further described herein below. As long as voltage across capacitor 70, $V_{raw}$, provided as an input to voltage regulator 72, is sufficient, output voltage $V_{reg}$ of voltage regulator 72 remains at a constant value, in this case 3.3 volts. During this period of time microprocessor 36 and non-volatile memory 44 remain on, processing data and storing data.

The magnitude of the event is measured as shown in FIGS. 3a-3d. As the magnitude of the charge $Q_{sense}$ generated by the event decreases from Q1 to Q2 to Q3, as shown in FIG. 3a, voltage supplied to ADC input of microprocessor 36 varies but microprocessor 36 remains off until regulated voltage $V_{reg}$ begins to be supplied by voltage regulator 72. No detection or measurement is made until microprocessor 36 powers up. Once pass transistor 52 and switching transistor 54 turn on and voltage regulator 72 begins to provide regulated voltage $V_{reg}$, the different voltages Q1, Q2, Q3 that may be provided along line Vhmon by different events to ADC input of microprocessor 36 can be measured, as shown in FIG. 3b. The magnitude of $V_{raw}$ and the length of time voltage regulator supplies regulated voltage $V_{reg}$ varies with the magnitude of the pulse, as shown in FIGS. 3c and 3d.

In the circuit of FIG. 1a, RV1 is a voltage suppressing varistor RV1 provided to prevent an overload or an electrostatic discharge from damaging such circuit elements as diolde bridge 22, capacitor C9, and MOSFET Q2. Varistor RV1 provides a variable resistance that automatically decreases as the magnitude of the voltage across RV1 increases above a threshold. A voltage suppressing varistor is selected to provide a this resistance lowering with a threshold voltage that is higher than can be provided by piezoelectric 20 and lower than a voltage that would damage the circuit elements.

Capacitors C11, C8, C5, C6 and C1 are all noise filtering capacitors to prevent high frequency noise from turning on such devices as switching transistor 54, processor 36, clock 42, and non-volatile memory 44.

Real time clock 42 has its own source of power, such as a button battery 78, so it can provide time regardless of the energy available from energy harvesting sensor 20. Regulated voltage from regulator 72 is supplied for communications between real time clock 42, non-volatile memory 44, and processor 36 on a shared serial bus, including SCL and SDA signals, as further described herein below.

A status LED D2 with current limiting resistor R7 can be used to indicate processor activity showing that an event occurred. Connector JP1 can be provided for contacting pins of microprocessor 36 for programming. R1, R2, and R3 are all pull up resistors that are specified by the manufacturer for operation of processor 36, real time clock 42, and non-volatile memory 44 to prevent an undefined state.

In order to read the data recorded in the memory 44 an alternate source of power may be used to power microcontroller 36 memory 44. $V_{ext}$ on pin 1 of diode 79 may be any external DC power source, such as that available through a USB connector. $V_{ext}$ is supplied through diode 79 to $V_{raw}$ that provides power from this external source to capacitor 70 and voltage regulator 72. Schottky barrier diode 79 protects the external source from any high voltage that may otherwise appear at $V_{raw}$.

Figure 1B:
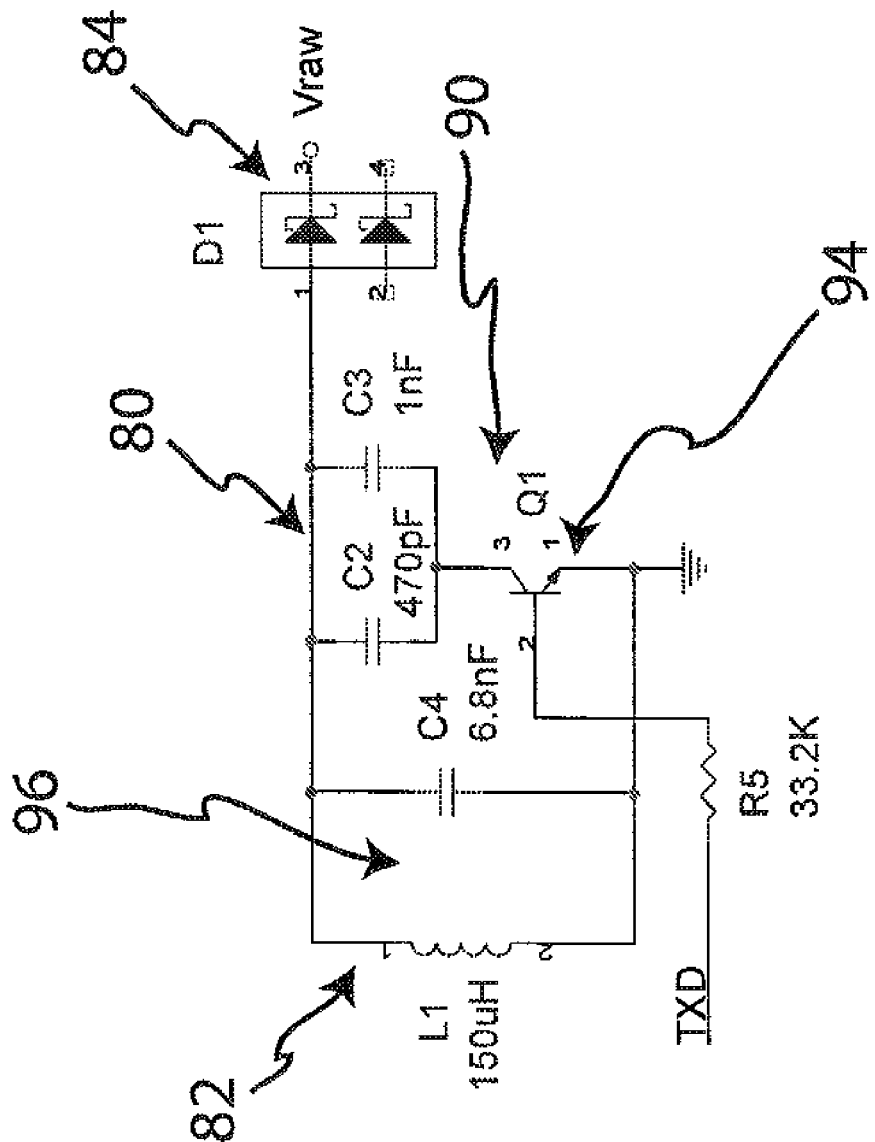
FIG. 1*b* is a schematic diagram of an inductive scheme for powering the electronic devices of FIG. 1*a* using switched reactance for reading data stored in memory.

The alternate source of power can also be inductive power source 80, as shown in FIG. 1b. In this circuit, an external AC magnetic field is applied to coil 82. The AC magnetic field may be supplied by a coil of a reader (not shown) excited by an AC source and brought into close proximity with coil 82. This AC magnetic field generates an AC voltage in coil 82. This AC voltage is rectified by diode 84 and supplied to the common voltage regulator input $V_{raw}$ that provides power from this inductive source to capacitor 70 and voltage regulator 72.

The AC magnetic field can also be generated by a magnet moving relative to coil 82. Such movement may be provided by a vibrating or rotating body in the vicinity of coil 82. This vibration could be produced by an impact event.

Thus capacitor 70 and voltage regulator 72 have inputs coming from three possible sources of electricity, piezo 20, $V_{ext}$, and an external AC magnetic field. Diodes 74, 79, and 84 provide a diode power multiplexer function enabling these three sources.

Reading the data can be accomplished using switched reactance circuit 90 including capacitors C2, C3, and C4 and transistor switch 94 that operates under control of processor 36 through line TXD seen in both FIG. 1a and FIG. 1b. Processor sends data from memory 44 along line TXD to control operation of transistor switch 94 that modulates reactance of tank circuit 96 including coil 82 and capacitors C4, C2, and C3, as shown in FIG. 1b, and thus modules a carrier signal radiated by and detected by the reader.

Microcontroller 36 can include many analog and digital functions, and its functionality to energy ratio is usually much higher than can be obtained with discrete or programmable gate array circuits. Although most small 8-bit microcontrollers take very little power to run, the power needed is usually higher than can be obtained directly from most voltage and current generating sensors. The power harvesting circuit described herein above allows enough charge to be collected at high voltage to power almost any microcontroller for the very short time needed to record the signal generated by a sensor.

Two factors that regulate how much the microcontroller can do in the short amount of "on" time provided by the harvesting circuit are the startup time and the energy per instruction cycle. The quicker the startup and the lower the energy per instruction cycle, the less energy required to record data from a sensor, allowing smaller and higher sensitivity sensors to be used.

Microcontroller 36 may be a small 8 bit microcontroller, such as part number C8051F300 described herein above, with an internal RC oscillator and very low charge per instruction cycle, on the order of 0.27 nA-Sec/instruction. Although RC oscillators usually take more energy than crystal oscillators, they start up almost instantaneously and the advantage in startup time for a microcontroller with an RC oscillator far outweighs the penalty in higher continuous current draw compared to a microcontroller with a crystal oscillator.

In addition to FRAM, various non-volatile memories can be used for recording data. EEPROM, Flash, NVRAM, and low power static RAM with battery backup could be used.

A bidirectional, multimaster, synchronous, shared serial bus, such as an I2C interface as defined by the Philips Corporation, including the bidirectional signals SDA and SCL, is used in this circuit to communicate data and clocking between microprocessor 36, real time clock 42, and non-volatile memory 44 because the I2C interface allows for access from external processors, such as a personal computer, for reading and writing data and timing, if desired.

As described herein above, coil 82 and switched reactance circuit can be used both to provide power for reading data logged in memory 44 and to provide a path for transmitting that data from memory 44 to an external reader. Alternatively, because memory 44 has an I2C interface it could also be read by a second externally powered processor such as a personal computer with an I2C interface card.

One alternate embodiment uses digital delay line 110 rather than a microprocessor, as shown in FIGS. 4a-4b and 5a-5b. Discrete sensor, energy harvester, and data recording circuit 112 includes power conditioning circuit 114, sequencer 116 and memory incrementor 118. Power conditioning circuit 114 includes bridge rectifier and energy harvesting circuit 120 and voltage regulator with power on reset 122. Memory incrementor 118 includes a fixed address in non-volatile memory 124 and counter 126a, 126b. Power conditioning circuit 114 may be similar to energy harvesting energy harvesting circuit 50 of FIG. 1a. Digital delay line 110 can include logic elements, such as flip flops. Digital delay line 110 can also include a programmable digital delay line, available from companies such as Maxim Integrated Products, Inc., Sunnyvale, Calif.

Figures 4A, 4B:
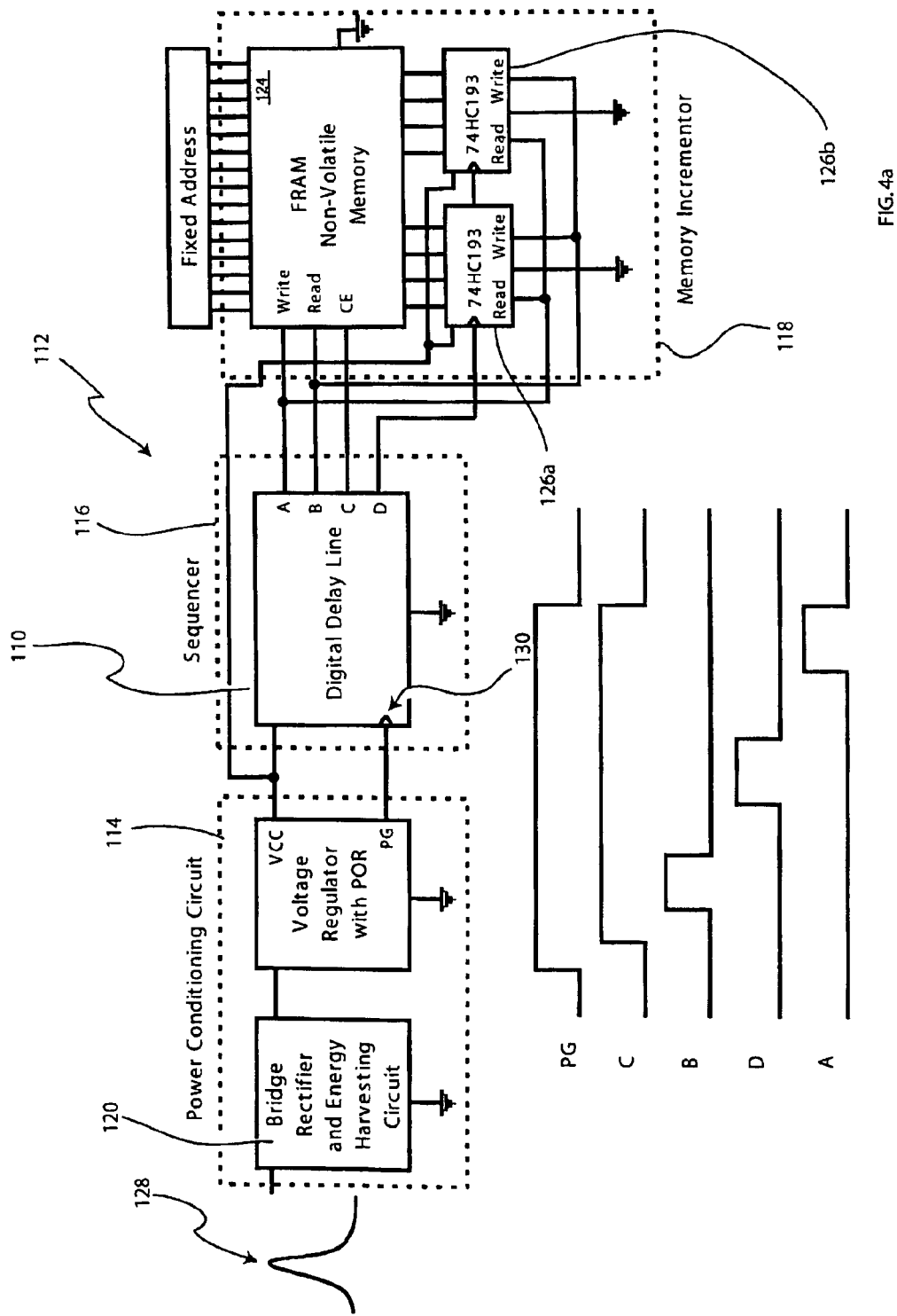
FIG. 4*a* is a block diagram of an alternate embodiment of an energy harvesting sensor circuit that uses energy derived from a sensor to power discrete electronic devices for counting the number of events in a non-volatile memory.
FIG. 4*b* are timing diagrams for the circuit of FIG. 4*a* showing voltages at various points in the sequencer circuit as time progresses in response to an event that provides sufficient energy to power on the voltage regulator.

Voltage regulator with power on reset 122 provides two outputs, Vcc and power good (PG). The PG output is high when the regulated voltage is correct and is not lower than expected. Digital delay line 110 includes enabling input pin 130 that receives signal from PG. Digital delay line 110 also has four outputs, A, B, C, and D that are used by non-volatile memory 124 and by counter 126a, 126b. The rising or falling of one output causes the next to rise, and that sequencing gives the measured and desired delay for clocking specifications of non-volatile memory 124 and counters 126a, 126b, as shown in FIG. 4b.

If input signal 128 from the piezoelectric to power conditioning circuit 114 is of sufficient magnitude PG output of voltage regulator with power on reset 122 will go high. Digital delay line 110 provides a rising edge for output C in response to receiving this high PG signal at pin 130. Output C is connected to chip enable pin CE of non-volatile memory 124, enabling reading and writing of data to and from memory 124 to counter 126a, 126b in the following sequence.

In addition to enabling non-volatile memory 124, the rising edge of output C also provides a rising edge on output B that reads the number stored in a specified memory location of non-volatile memory 124 and writes that data to counter 126a, 126b.

A falling edge of output B causes a high voltage on output D that increments the number now in counter 126a, 126b by one.

A falling edge of output D causes a high voltage on output A that reads the new number in counter 126a, 126b and writes the new number in counter 126a, 126b to the fixed address in non-volatile memory 124.

Thus, events that provide sufficient power to bridge rectifier and energy harvesting circuit 120 to provide adequate voltage from voltage regulator with power on reset 122 are counted by discrete sensor, energy harvester, and data recording circuit 112 without the need for a microprocessor and using substantially less energy than would normally be needed to power a microprocessor. Events that do not meet the threshold energy to provide the correct voltage from voltage regulator with power on reset 122 are ignored by discrete sensor, energy harvester, and data recording circuit 112.

Figures 5A, 5B:
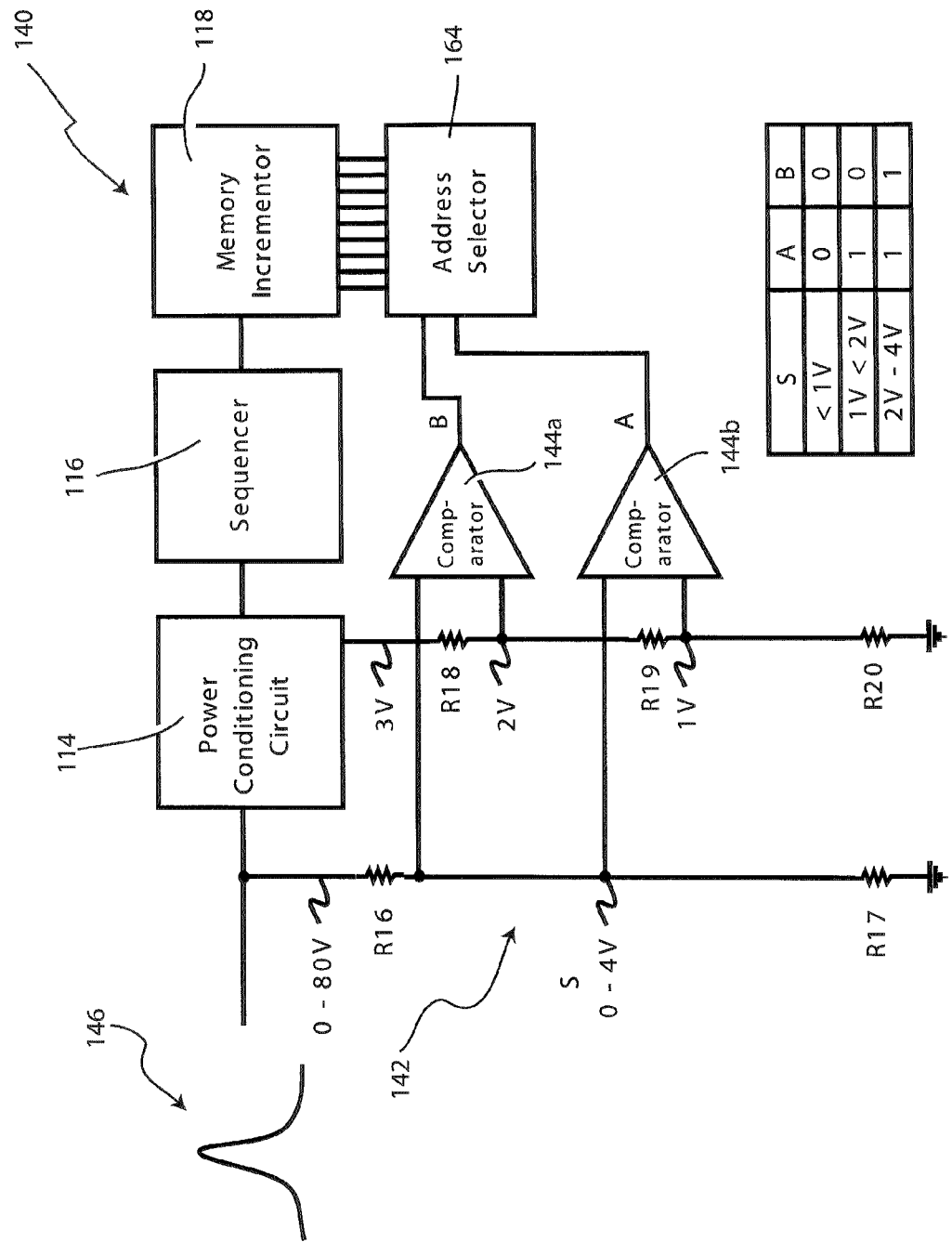
FIG. 5*a* is a block diagram of an alternate embodiment of a bin counter connected to an energy harvesting sensor circuit that uses energy derived from a sensor to power discrete electronic devices for counting the number of events at a number of different energy levels and storing the data in non-volatile memory locations.
FIG. 5*b* is a logic table of the output of the circuit of FIG. 5*a*.

Bin counter 140 can be used to provide magnitude of such events can be accomplished with laddered resistors 142 and comparators 144a, 144b, as shown in an illustrative example in FIGS. 5a-5b. Input signal 146 from a piezoelectric and from a bridge rectifier that, for example, may be in the range from 0 to 80 volts is divided in 20 fold voltage divider 142 to provide a voltage to one leg of comparators 144a, 144b in the 0 to 4 volt range, as shown in FIG. 5a. Voltage divider 142 includes resistors R16 and R17.

Regulated output from voltage regulator 122 in power conditioning circuit 114 is provided to the other leg of comparators 144a, 144b through another voltage divider 148 to provide comparison reference voltages of 1 V and 2 V. Voltage divider 148 includes resistors R18, R19 and R20. As long as power conditioning circuit 114 is providing its designed regulated voltage output reference voltages provided to comparators 144a, 144b are correct.

Outputs of comparators 144a, 144b provide the addresses of memory locations in non-volatile memory 124 in memory incrementor 118 according to the magnitude of the voltage determined by comparators 144a, 144b, as shown by the logic table of FIG. 5b. A number stored in a memory location for a specified value of voltage is incremented by an event having that value of voltage by operation of sequencer 116, memory incrementor 118 and address selector 164, as described for the counter of FIG. 4a.

A measure of the magnitude of the event is determined from the logic table of FIG. 5b. If input signal 146 provides a divided voltage to comparators 144a, 144b that is greater than the 1 V reference A is high. If the divided voltage signal is greater than the 2 V reference B is also high. According to the logic table, if neither A nor B is high, input signal 146 provided a divided voltage of less than 1 volt. If A is high and B is low, input signal 146 provided a divided voltage that was greater than 1 volt and less than 2 volts. If A is high and B is high, input signal 146 provided a divided voltage of between 2 and 4 volts.

Bin counter 140 provides a specified memory address for each possible voltage level. Bin counter 140 accumulates a count of the number of input signals 146 that had a particular voltage level in the memory location having that address. The number stored in in a memory addresses for a specified voltage level is incremented according to the results of the logic table for each subsequent input signal 146 to provide the count. A histogram of data from all the input signals 146 is obtained by looking at the contents of all the used memory addresses.

The actual voltages provided by input signals 146 themselves, in the example illustrated in FIG. 5a would be 20 times larger than the voltages seen by comparators 144a, 144b which are connected to voltage divider 148. Thus, the magnitude of each input signal 146 of a series of input signals 146 can be measured and recorded in non-volatile memory using only discrete logic elements and using only the energy provided by the input signals 146 themselves.

The sensor of the present patent application can be used to detect impacts to structures and vehicles. One example is for tracking damage to helicopter components, such as a landing gear. Impact of a landing may be recorded and its magnitude measured using the energy generated in a piezoelectric sensor from the impact itself using any of the technique provided of the present patent application.

In addition to energy from a single event, such as a gun shot or a hard landing, energy from cyclic strains above a threshold within a component, such as may be present in a helicopter's rotating components when the helicopter is conducting a maneuver, may also be converted into electrical power for both logging data and for powering the circuit for logging the data.

Stored energy obtained from the energy harvesting sensor can also be used to provide power for another sensor for reading data from a sensor with a sensing node. For example, while processor 36 is operating it can read temperature data.

Under processor control, once data from an event has been recorded in memory, the processor can direct that any additional energy stored in capacitors 24 and 70 be transferred to another energy storage device, such as a battery or super capacitor, as described in the '693 patent. This energy can then be used to power a wireless transmitter, as also described in the '693 patent.

Uses described in the '059 patent application, including monitoring impact events, such as from flying objects on a protective skin or tile of an aircraft, firing of a gun, impacts on landing gear and suspension systems, impacts on a racquet, and the opening and closing of doors and protective enclosures, also apply to embodiments of the present patent application. Embodiments of the present patent application can also be integrated with circuits of the '059 patent application, including FIGS. 11a, 11b, and 12a-12e, adding function, such as additional energy harvesting from vibration, solar, and external electromagnetic field to charge a rechargeable battery or capacitor.

An array of piezoelectric impact sensors can be deployed, any one of which can supply power for operating CPU 24 in FIG. 5d of the '059 patent application.

While the disclosed methods and systems have been shown and described in connection with illustrated embodiments, various changes may be made therein without departing from the spirit and scope of the invention as defined in the appended claims.

The invention claimed is:

1. A system comprising a structure and a circuit, said circuit mounted to said structure, said circuit including a sensor, a non-volatile memory, and a voltage sensitive switch, wherein said memory and said voltage sensitive switch are connected for recording a single event sensed by said sensor, wherein said sensor generates power during said single event, wherein all power used in making said recording is derived from said sensor during said single event, wherein said voltage sensitive switch is connected to prevent charge from being transferred to said memory until a voltage derived from said sensor exceeds a threshold.

2. A system as recited in claim 1, wherein said voltage sensitive switch is connected for providing power to said memory when said voltage derived from said sensor exceeds said threshold.

3. A system as recited in claim 1, further comprising a first energy storage device, wherein said voltage sensitive switch is connected for providing power to said memory when a voltage across said first energy storage device exceeds said threshold.

4. A system as recited in claim 1, further comprising a processor, wherein said voltage sensitive switch is connected for providing power to said processor when said voltage derived from said sensor exceeds said threshold.

5. A system as recited in claim 4, wherein said processor is connected for receiving a signal derived from said sensor, wherein said non-volatile memory is connected to said processor for receiving and storing data derived from said signal.

6. A system as recited in claim 4, further comprising a real time clock connected to provide a time stamp to data stored in said non-volatile memory.

7. A system as recited in claim 4, wherein said processor comprises an 8 bit microcontroller with an internal RC oscillator.

8. A system as recited in claim 1, further comprising a regulator, wherein said voltage sensitive switch is connected for providing power to said regulator when said voltage derived from said sensor exceeds said threshold, wherein said regulator is connected to provide a regulated voltage to said processor and to said non-volatile memory.

9. A system as recited in claim 8, further comprising a first energy storage device and a second energy storage device connected to receive energy from said first energy storage device through said switch, wherein said regulator is connected to receive energy from said second energy storage device when said switch is open.

10. A system as recited in claim 9, wherein said first energy storage device includes a first capacitor and wherein said second energy storage device includes a second capacitor.

11. A system as recited in claim 1, wherein said switch includes a bipolar transistor.

12. A system as recited in claim 11, wherein said switch includes a Darlington pair.

13. A system as recited in claim 1, further comprising a voltage divider, wherein said voltage sensitive switch includes a control electrode, wherein said voltage divider is connected to receive said energy from said sensor, wherein said control electrode is connected to said voltage divider to receive a fraction of voltage across said voltage divider.

14. A system as recited in claim 1, further comprising a rectifier connected to rectify a signal from said sensor.

15. A system as recited in claim 14, wherein said rectifier includes a full wave rectifier.

16. A system as recited in claim 1, wherein said non-volatile memory includes at least one from the group consisting of EEPROM, NVRAM, FLASH, FRAM, and low power static RAM, wherein said low power static RAM has battery backup.

17. A system as recited in claim 1, further comprising a second source of power, wherein said non-volatile memory is connected to receive power from said second source of power for communicating data stored in said non-volatile memory.

18. A system as recited in claim 17, wherein said second source of power includes at least one from the group consisting of inductive power and a wired connection to external power.

19. A system as recited in claim 18, wherein said second source of power includes a coil.

20. A system as recited in claim 19, wherein said second source of power includes a magnet in relative motion with said coil.

21. A system as recited in claim 18, wherein said second source of power includes said wired connection, and wherein said wired connection includes at least one from the group consisting of a DC power source, a USB, a CAN bus, and a power over ethernet connector.

22. A system as recited in claim 17, further comprising a diode power multiplexer.

23. A system as recited in claim 1, further comprising a rechargeable energy storage device and a radio transmitter, wherein said rechargeable energy storage device receives all its power derived from said sensor, wherein said radio transmitter is connected to receive power from said rechargeable energy storage device.

24. A system as recited in claim 1, further comprising at least one from the group consisting of a battery and a super capacitor connected for storing energy derived from said sensor.

25. A system as recited in claim 1, wherein said threshold is sufficient to turn on and operate said memory for a sufficient time to record said event.

26. A system comprising a structure and a circuit, said circuit mounted to said structure, said circuit including a sensor, a processor, and a non-volatile memory, wherein said processor and said memory are connected for measuring and recording a single event sensed by said sensor, wherein said sensor generates power during said single event, wherein all power used in said measuring and said recording is derived from said sensor during said single events wherein said circuit includes a switch connected to prevent charge from being transferred to said processor and to said memory until a voltage derived from said sensor exceeds a threshold.

27. A system as recited in claim 26, wherein said structure includes at least one from the group consisting of a vehicle, a building, infrastructure, a weapon, an article of clothing, and a living thing.

28. A system as recited in claim 27, wherein said structure includes said vehicle, and wherein said vehicle includes at least one from the group consisting of an automobile, a truck, a boat, and an aircraft.

29. A system as recited in claim 27, wherein said structure includes said infrastructure, and wherein said infrastructure includes at least one from the group consisting of a bridge, a pipe, a road, and a runway.

30. A system as recited in claim 27, wherein said structure includes said weapon, and wherein said weapon includes at least one from the group consisting of a gun, a rocket, and a missile.

31. A system as recited in claim 27, wherein said structure includes a vehicle, wherein said vehicle includes at least one element from the group consisting of a protective skin and a tile, and wherein said single event includes an impact from a flying object on said element.

32. A system as recited in claim 27, wherein said structure includes a weapon, wherein said weapon includes a gun, and wherein said single event includes an impact from firing of said gun.

33. A system as recited in claim 27, wherein said structure includes a vehicle, wherein said vehicle includes a landing gear, and wherein said single event includes an impact from operation of said landing gear.

34. A system as recited in claim 27, wherein said structure includes a vehicle, wherein said vehicle includes a suspension system, and wherein said single event includes an impact from operation of said suspension system.

35. A system as recited in claim 26, wherein said structure provides energy to said circuit from at least one from the group consisting of vibration, strain, and an impact.

36. A system as recited in claim 26, wherein said non-volatile memory includes FRAM.

37. A system as recited in claim 26, wherein said threshold is sufficient to turn on and operate said processor and said memory for a sufficient time to record said event.

38. A system as recited in claim 26, wherein said structure includes a racquet, and wherein said single event includes an impact on said racquet.

39. A system as recited in claim 26, wherein said structure includes a door, and wherein said single event includes an impact from at least one from the group consisting of opening and closing of said door.

40. A system as recited in claim 26, wherein said structure includes a protective enclosure, and wherein said single event includes an impact from at least one from the group consisting of opening and closing of said protective enclosure.

41. A system comprising a structure and a circuit, said circuit mounted to said structure, said circuit including a sensor, a voltage sensitive switch, a logic circuit, and a memory, wherein said logic circuit and said memory are connected for recording a single event sensed by said sensor, wherein said sensor generates power during said single event, wherein all power used in making said recording is derived from said sensor during said single event, wherein said voltage sensitive switch is connected to prevent charge from being transferred to said logic circuit and to said memory until a voltage derived from said sensor exceeds a threshold.

42. A system as recited in claim 41, wherein said logic circuit includes a digital delay line.

43. A system as recited in claim 41, wherein said threshold is sufficient to turn on and operate said logic circuit and said memory for a sufficient time to measure and record said event.

44. A system comprising a structure and a circuit, said circuit mounted to said structure, said circuit including a sensor, a voltage sensitive switch, a processor, and a memory, wherein said processor and said memory are connected for recording a single event sensed by said sensor, wherein said sensor generates power during said single event, wherein all power used in making said recording is derived from said sensor during said single event, wherein said voltage sensitive switch is connected to prevent charge from being transferred to said processor and to said memory until a voltage derived from said sensor exceeds a threshold.

45. A system as recited in claim 44, wherein said threshold is sufficient to turn on and operate said processor and said memory for a sufficient time to record said event.

* * * * *